(12) United States Patent
Plant

(10) Patent No.: US 9,375,041 B2
(45) Date of Patent: Jun. 28, 2016

(54) ENERGY ABSORBING SYSTEM

(76) Inventor: Daniel James Plant, Cowbridge (GB)

(*) Notice: Subject to any disclaimer, the term of this patent is extended or adjusted under 35 U.S.C. 154(b) by 1248 days.

(21) Appl. No.: 13/140,438

(22) PCT Filed: Dec. 21, 2009

(86) PCT No.: PCT/EP2009/067669
§ 371 (c)(1),
(2), (4) Date: Jun. 17, 2011

(87) PCT Pub. No.: WO2010/076257
PCT Pub. Date: Jul. 8, 2010

(65) Prior Publication Data
US 2012/0021167 A1     Jan. 26, 2012

(30) Foreign Application Priority Data

Dec. 19, 2008 (GB) .................................. 0823154.0
Oct. 29, 2009 (GB) .................................. 0919040.6

(51) Int. Cl.
| | | |
|---|---|---|
| F16F 7/00 | (2006.01) | |
| A41D 13/015 | (2006.01) | |
| B32B 3/26 | (2006.01) | |
| A41D 31/00 | (2006.01) | |
| F16F 7/12 | (2006.01) | |

(52) U.S. Cl.
CPC .......... *A41D 31/005* (2013.01); *A41D 13/0156* (2013.01); *B32B 3/26* (2013.01); *F16F 7/121* (2013.01); *Y10T 428/24149* (2015.01); *Y10T 428/24942* (2015.01)

(58) Field of Classification Search
CPC ............................. B65D 81/03; B65D 65/406
USPC ............. D29/101.3; 248/562, 346.4; 428/180
See application file for complete search history.

(56) References Cited

U.S. PATENT DOCUMENTS

| | | | | |
|---|---|---|---|---|
| 2,154,640 | A * | 4/1939 | Romanoff ..................... | 428/181 |
| 3,231,454 | A * | 1/1966 | Williams ...................... | 428/178 |
| 3,935,360 | A * | 1/1976 | Brown ......................... | 428/184 |
| 4,371,493 | A * | 2/1983 | Minuto ........................ | 264/236 |
| 4,748,067 | A * | 5/1988 | Cline ........................... | 428/186 |
| 5,180,619 | A * | 1/1993 | Landi et al. .................. | 428/116 |
| 5,518,802 | A * | 5/1996 | Colvin et al. ................ | 428/180 |
| 5,854,143 | A * | 12/1998 | Schuster et al. ............. | 442/135 |
| 6,190,756 | B1 * | 2/2001 | Yokoyama et al. .......... | 428/174 |
| 6,913,802 | B1 * | 7/2005 | Plant ............................ | 428/176 |

(Continued)

FOREIGN PATENT DOCUMENTS

| | | |
|---|---|---|
| DE | 43 36 468 A1 | 4/1995 |
| GB | 2 349 798 A | 11/2000 |

(Continued)

OTHER PUBLICATIONS

International Search Report corresponding to International Application No. PCT/EP2009/067669, date of completion was Jun. 24, 2010 and date of mailing was Jul. 13, 2010; 3 pages.

*Primary Examiner* — David Sample
*Assistant Examiner* — Nicholas W Jordan
(74) *Attorney, Agent, or Firm* — EIP US LLP

(57) ABSTRACT

A flexible energy absorbing system including a material coated, impregnated and/or combined with a strain rate sensitive substance is disclosed. The flexible energy absorbing system is formed so as to define repeating adjacent cells, each cell having a re-entrant geometry such that, upon impact, the material locally densifies at the impact site.

21 Claims, 10 Drawing Sheets

(56) References Cited

U.S. PATENT DOCUMENTS

| | | | |
|---|---|---|---|
| 7,160,621 B2* | 1/2007 | Chaudhari et al. | 428/412 |
| 7,608,314 B2* | 10/2009 | Plant | 428/116 |
| 2004/0171321 A1* | 9/2004 | Plant | 442/64 |
| 2006/0070171 A1 | 4/2006 | Copeland et al. | |
| 2009/0305589 A1* | 12/2009 | Budden et al. | 442/59 |

FOREIGN PATENT DOCUMENTS

| | | |
|---|---|---|
| WO | WO 01/15892 A1 | 3/2001 |
| WO | WO 2004/012934 A1 | 2/2004 |
| WO | WO 2005/000966 A1 | 1/2005 |
| WO | WO 2006/036072 A1 | 4/2006 |

* cited by examiner

Figure 1

50g Samples, 12mm thick

| % fibres by mass | Fibre | Unfiltered | Filtered | Notes |
|---|---|---|---|---|
| 10 | 4mm Viscose | 12.23 | 12.24 | No damage |
| 3.9 | 1mm Carbon | 11.93 | 9.83 | Cracked |
| 10 | 1mm Viscose | 10.12 | 10.11 | Exploded |
| 0 | None | off scale | off scale | Exploded |

Figure 2A

Thickness vs Back Face Signature Summery

| # Layers | Material | BFS (mm) | % reduction compared to plain Aramid |
|---|---|---|---|
| 24 | Plain | 30.85 | - |
| 24 | I | 20.00 | 35.17 |
| 24 | II | 27.80 | 9.89 |
| 24 | III | 30.60 | 0.81 |
| 20 | Plain | 32.40 | - |
| 20 | I | 23.75 | 26.70 |
| 20 | II | 28.70 | 11.42 |
| 20 | III | 29.25 | 9.72 |
| 16 | Plain | 36.50 | - |
| 16 | I | 28.10 | 23.01 |
| 16 | II | 30.95 | 15.21 |
| 16 | III | 33.20 | 9.04 |

Figure 2b

Summary for 700g armour panel

| Material | BFS (mm) | % reduction compared to plain Kevlar |
|---|---|---|
| Plain | 32 | - |
| I | 31 | 3.1 |
| II | 30 | 6.3 |
| III | 27 | 15.6 |

Figure 3

| EN1621-1 | | | |
|---|---|---|---|
| Description | KN | Thickness MM | Mass /M$^2$ KG/Meter$^2$ |
| 18 | 9.1 | 18 | 7.39 |
| 14 | 12.0 | 14 | 6.34 |
| 10 | 15.2 | 10 | 5.15 |
| 8 | 19.6 | 8 | 4.40 |
| 6 | 28.4 | 6 | 4.35 |
| 4 | 32.8 | 4 | 3.22 |
| 4+4 | 17.3 | 8 | |
| 10 Cold (-24C) | 14.8 | 10 | |
| 14(TPE/Dilatant Solid) | 12.1 | 14 | |
| 5+5+5+3 Solid | 10.7 | 18 | |
| D30 | 49.1 | 10 | 5.10 |
| D30 shape PU | 45.0 | 10 | 5.02 |
| 2APS (white) | 24.0 | 15 | 5.00 |

| EN1621-2 | | |
|---|---|---|
| Description | Thickness | kN |
| 18 | 18 | 9.35 |
| 14 | 14 | 11.76 |
| 14+Kevlar | 14.2 | 9.35 |
| 14+4 | 18 | 10.28 |
| 10+10 | 20 | 8.44 |
| 6+6+4+4 | 20 | 7.92 |
| 6+6+4 | 16 | 9.71 |
| 18+18 | 36 | 5.7 |

Figure 4
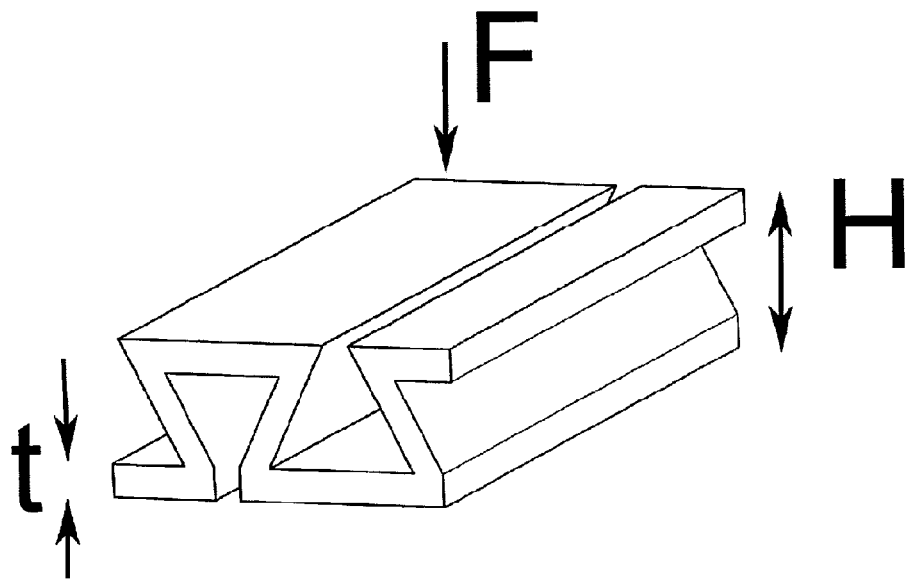
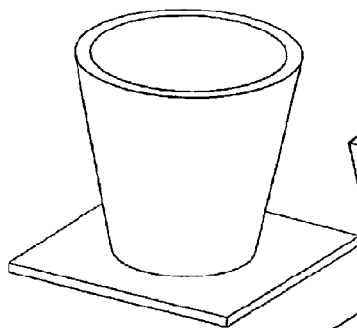
Figure 5
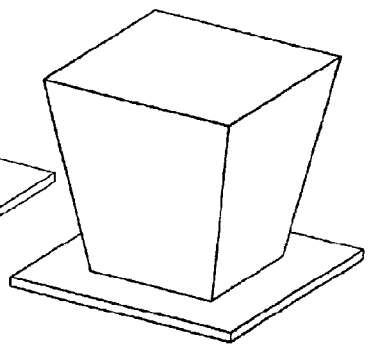
Figure 6
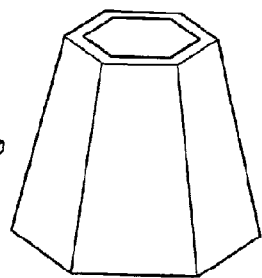
Figure 7

SECTION B-B

SECTION A-A

VIEW TOP

ENERGY ABSORBING SYSTEM

CROSS-REFERENCE TO RELATED APPLICATIONS

The present application is a 35 U.S.C §371 National Phase Filing claiming the benefit of and priority to International Application No. PCT/EP2009/067669, filed on Dec. 29, 2009, which claims the benefit of and priority to each of British (GB) Patent Application No. 0919040.6, filed on Nov. 2, 2009, and British (GB) Patent Application No. 0823154.0, filed on Dec. 19, 2008, the entire contents of each of which being incorporated herein by reference.

This invention relates to a flexible energy absorbing system that can be used for a variety of purposes including garments to provide impact protection to the wearer. Known impact protection solutions currently available tend to fall into two types, namely a rigid exterior shell which can be uncomfortable to wear (e.g. roller blade or skateboard knee or elbow pads) or foam or foam laminate pads (e.g. inserts for ski clothing) which provide poor levels of protection.

There is therefore a need to provide an energy absorbing material which is both lightweight and flexible therefore being comfortable to wear while still being able to dissipate and absorb shock loads applied to so as to provide effective protection.

In my earlier published UK patent application No. 2349798, a protective member is disclosed which uses an energy absorbing material which remains soft and flexible until it is subjected to an impact at which time it becomes rigid, said material being encapsulated in a flexible sealed envelope formed with one or more convolutions towards the direction of impact.

Considering an energy absorbing material alone, often impact, vibration or shock absorbing performance is related to the tensile strength of the parent material. This can be demonstrated in CE type tests namely EN1621-1 and EN1621-2 where the anvils are typically curved or domed. The impact performance of flexible energy absorbing materials is limited as they often bottom out and fracture at the impact site. Often the material is forced away from the contact area (impact site), leaving less energy absorbing material, usually leading to a reduced energy absorption and higher peak transmitted impact forces. The fracturing and movement of material away from the impact site is common in many materials but is especially important for flexible materials.

When we consider the area subjected to the highest load during an impact, typically a material will initially compress, in cellular products and foams this is sometimes referred to as the plateau region on a stress strain graph, further compressions leads to local densification, if total compression is limited to this then we have a normal recoverable energy absorbing system, further compression of the material "bottoms out" and the transmitted force increases and the material will start to fail by fracture. Further compression will break the material apart (fracture) moving material away from the contact site.

This application addresses ways to substantially prevent or stop the final fracture of material and keep material in the contact area.

The present invention therefore seeks to provide an energy absorbing material in which the movement of the material away from the contact site is reduced, stopped or even reversed, so that more material is introduced into the contact area during impact thereby improving energy management and absorption characteristics.

It has been found by the Applicant that materials according to the present invention exhibits considerably improved and surprising performance characteristics and impact resistance over known energy absorbing materials.

Accordingly, this application addresses how the energy absorption of an energy absorbing material may be improved by either adding a tensile layer to the energy absorbing material to provide local densification or restraint to the energy absorbing material, altering the geometry to give it a re-entrant configuration and/or introducing an active material such as a strain rate dependant material, preferably a dilatant material that exhibits chemical or silicone based dilatancy.

It will be appreciated that one or more of the improvements identified above may be used in combination with one or more of the other improvements to provide a further and often unexpected performance improvement.

SUMMARY

According to the invention, there is provided a flexible energy absorbing system comprising a material coated, impregnated and/or combined with a strain rate sensitive substance and formed so as to define repeating adjacent cells, each cell having a re-entrant geometry configured such that, upon impact, the material locally densifies at the impact site.

In one embodiment, the repeating cell is in the form of a tapering cylinder extending in a direction through the thickness of the energy absorbing material.

Alternatively, the repeating cell may be in the form of a tapering rectangular prism extending in a direction through the thickness of the energy absorbing material.

In another alternative, the repeating cell can be in the form of a tapering polygonal prism extending in a direction through the thickness of the energy absorbing material.

In yet another alternative, the repeating cell is formed from corrugations or folds in the energy absorbing material, the walls of each corrugation or fold being inwardly angled towards each other to form a re-entrant angle.

In a preferred embodiment, each repeating cell extends at least partially through the thickness of the energy absorbing material.

The taper of adjacent cells preferably extends in opposite directions through the thickness of the material such that said adjacent cells tessellate or overlap with each other.

In one embodiment, each cell is open at one end to form a re-entrant recess.

Preferably, the energy absorbing material exhibits a negative Poisson's ratio.

In a preferred embodiment, the strain rate sensitive material is a dilatant.

In a further embodiment, the energy absorbing system includes at least one layer of tensile material.

Preferably, the layer of tensile material is integrally combined with the energy absorbing material during moulding of the energy absorbing material.

The tensile material may be a textile layer.

In one embodiment, the tensile material is external to the energy absorbing material.

The energy absorbing material may include chopped fibres.

According to another embodiment of the invention, there is provided a flexible energy absorbing system comprising a material coated, impregnated and/or combined with a strain rate sensitive substance, and having at least one layer of tensile material.

In a preferred embodiment, the layer of tensile material is combined with the energy absorbing material during moulding of the energy absorbing material.

The tensile material may be a textile layer and it may be external to the energy absorbing material.

The tensile layer may be formed from a fibrous material.

According to the invention, there is also provided a method of forming a flexible energy absorbing system comprising a material coated, impregnated and/or combined with a strain rate sensitive substance, comprising the steps of moulding the material in a moulding machine configured so as to form repeating adjacent cells each having a re-entrant geometry, together with an external layer of tensile material such that the energy absorbing material couples with the tensile layer during the moulding process, and pulling on the tensile material layer to peel and free the energy absorbing material from the mould.

DETAILED DESCRIPTION OF THE DRAWINGS

Embodiments of the present invention will now be described, by way of example only, with reference to the accompanying drawings, in which:

FIG. 1 is a table to show how the addition of chopped fibres to the parent material improves the performance of energy absorbing dilatant material;

FIG. 2A is table to shows the percentage reduction in back face signature compared to an equivalent thickness textile pack for each test sample when compared to plain Aramid;

Figure 8:
Figure 8:
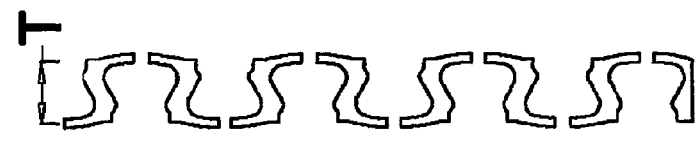
Figure 8:
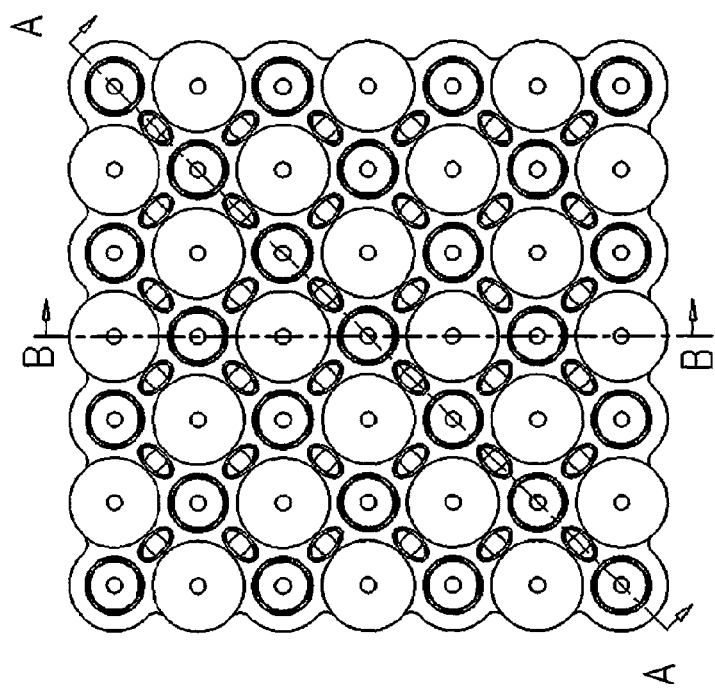
Figure 8:
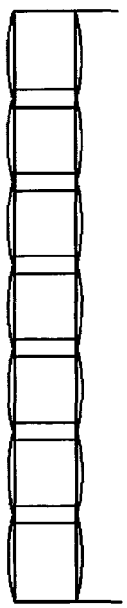
Figure 9:
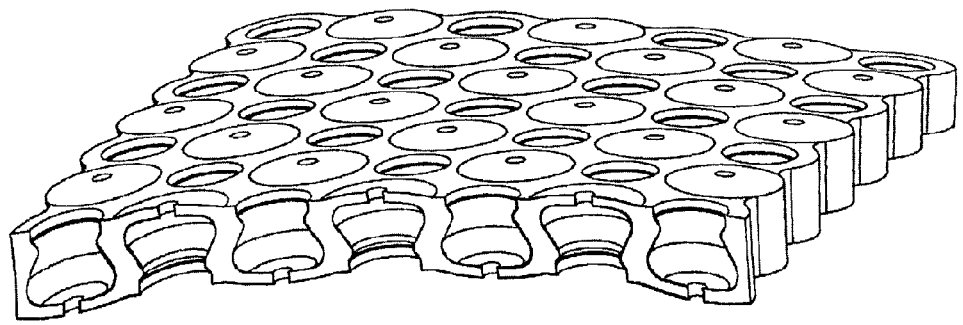
Figure 10:
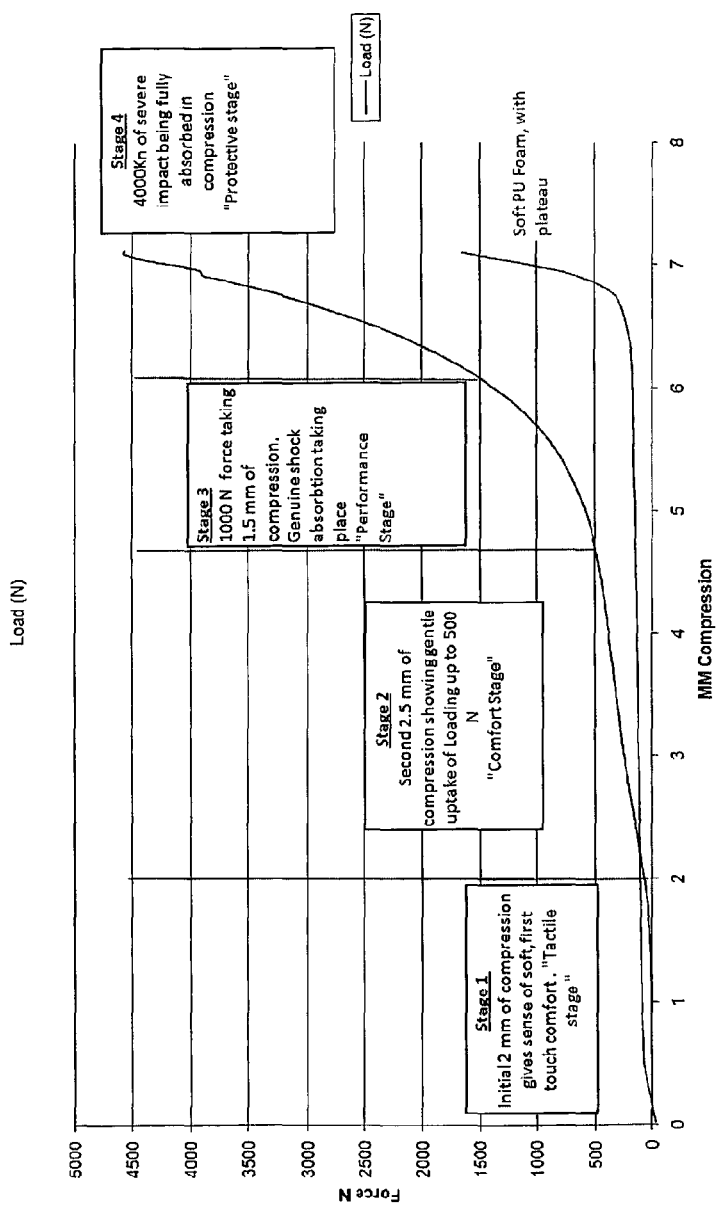
Figure 11:
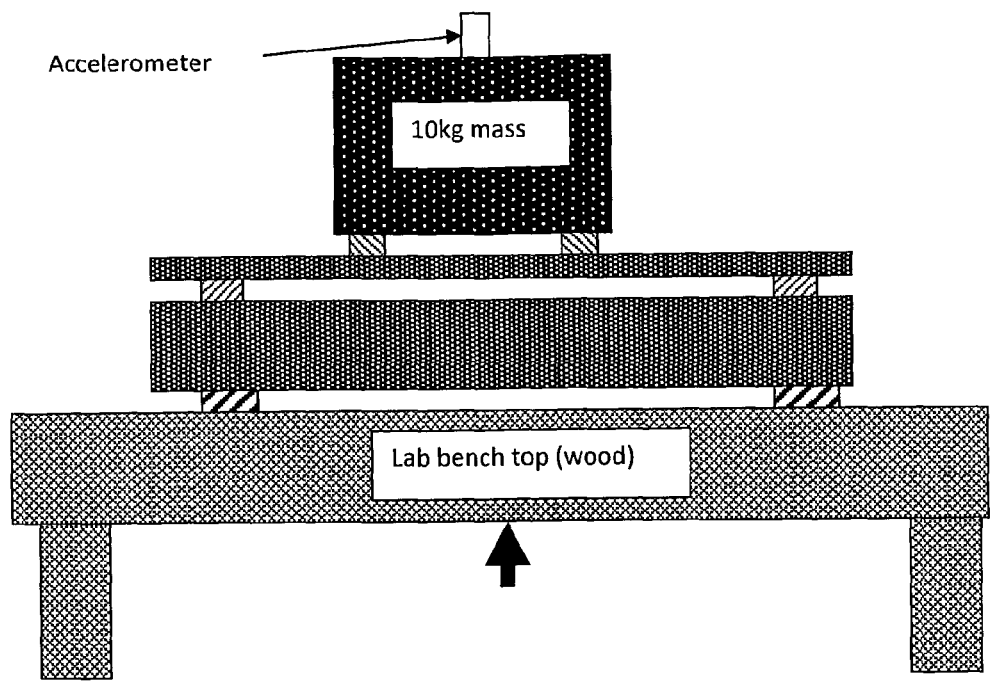
Figure 12A:
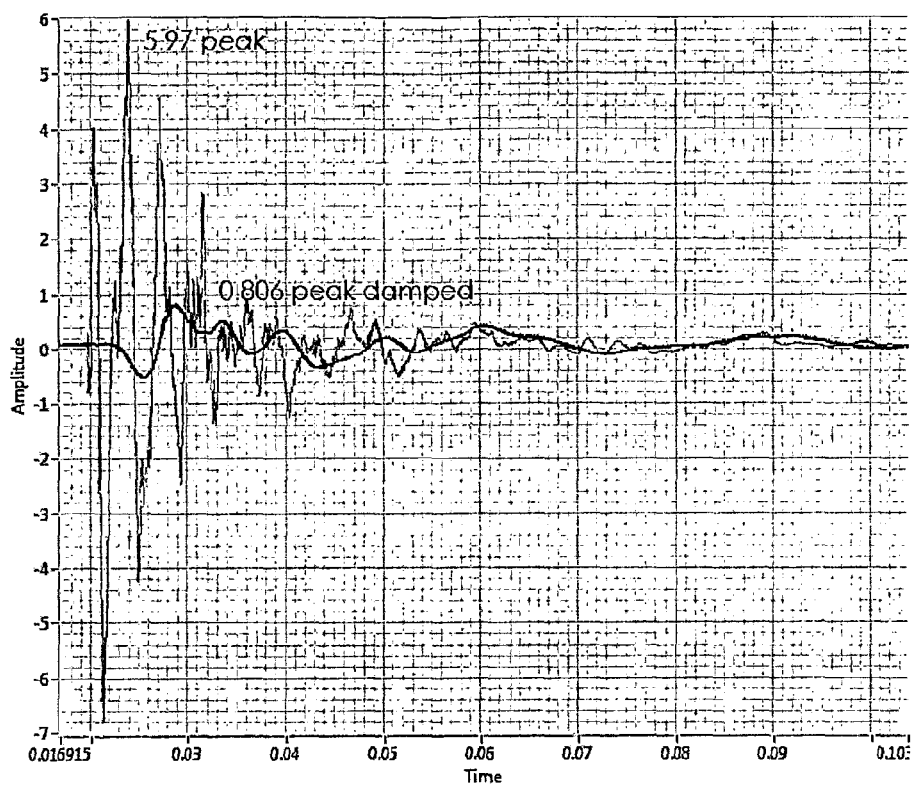
Figure 12B:
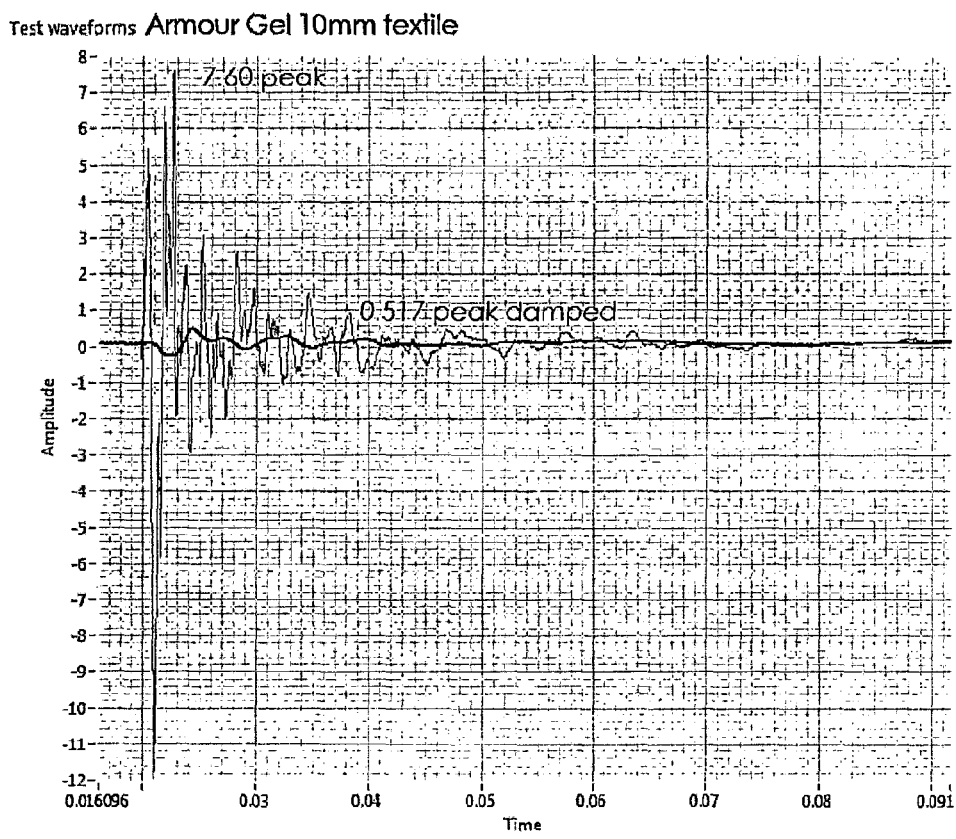
Figure 13:
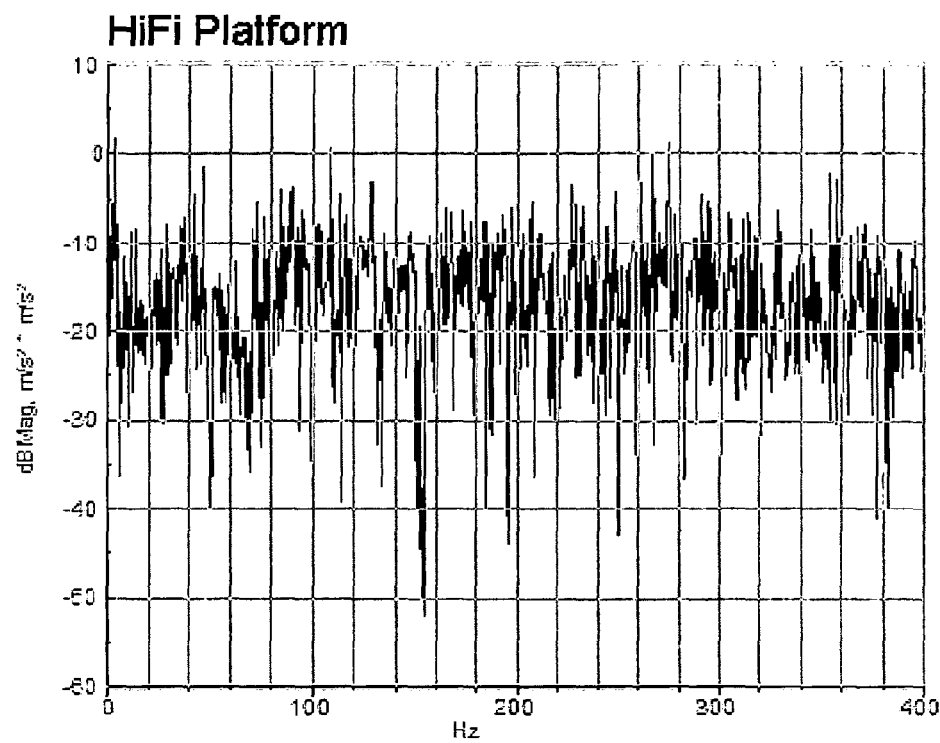
Figure 13:
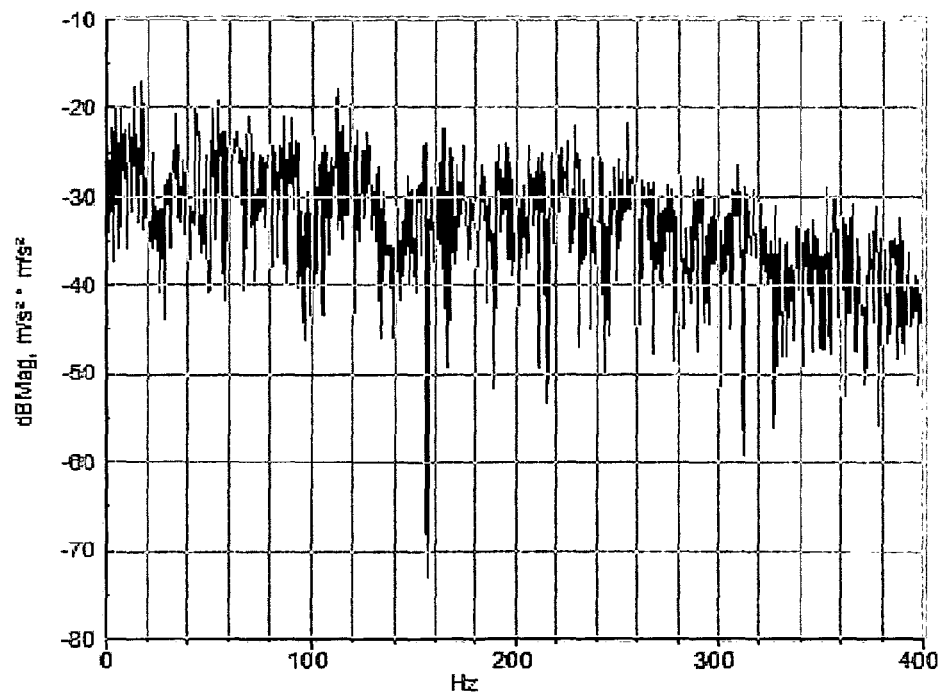

FIG. 2B shows a similar comparison to that of FIG. 2A showing the percentage reduction in back face signature when compared to plain Aramid FIG. 3 is a table to show that a shear thickening material and tensile layer are also effective at reducing back face signature produced by a jacket of a set mass, producing up to a 15.6% reduction in back face signature and requiring fewer layers of tensile material;

FIG. 4 is a front three quarter view showing a re-entrant section of a flexible energy absorbing material;

FIG. 5 shows an outwardly tapering and so re-entrant cylinder protruding in the direction of impact and shelled out from the top;

FIG. 6 shows an outwardly tapering re-entrant square shown to be shelled out from below;

FIG. 7 shows an outwardly tapering re-entrant hexagon;

FIG. 8 is a drawing of a moulded re-entrant part having a number of re-entrant cells all with negative draft angle;

FIG. 9 shows the re-entrant part of the part shown in FIG. 8;

FIG. 10 shows four discreet stages in compression of a material according to one embodiment of the invention;

FIG. 11 shows a HiFi vibration isolation platform used in the performance testing of the material to determine is vibration absorption characteristics;

FIGS. 12A and 12B are graphs to show the damping isolation platforms with a load of 10 KG placed on top;

FIG. 13 shows the transfer function when these two systems were tested against back ground noise, and the transfer function response was measured;

DETAILED DESCRIPTION OF EMBODIMENTS

Tensile Layer

In one embodiment the energy absorbing system is made from an energy absorbing material and a tensile layer. This tensile layer is preferably fibrous; the energy absorbing layer is preferably active.

The tensile layer can be added, combined, joined inserted or coated anywhere to the energy absorbing material, preferably either the top or bottom (outside) or within the material. More than one tensile layer may be added. The tensile layer can be added during manufacture, or added after manufacture by any suitable method. This tensile layer gives the impact site much higher local resistance to fracture, therefore restraining the energy absorbing material from moving away from the impact site to attain improved performance. Energy absorbing materials with a textile backing have been shown to reduce transmitted force from an impact event by more than 50%.

Examples and comparative examples are provided below in order to describe the present invention in specific terms; however, the present invention is not limited to the examples provided.

A typical material has been impact tested comprising of a sheet of reticulated foam 9 mm thick foam type PS85 from Recticel impregnated in silicone dilatant to a density of 257 $kg/m^3$. The flexible energy absorbing material had a peak transmitted force of 17.558 kN, 39.352 kN and >130 KN for 300 mm, 600 mm and 1000 mm drop heights respectively when tested with EN1621-1 anvils at 5 KG drop mass. The same sample including an additional tensile layer, in this case aramid textile gave peak transmitted forces of 16.043 kN, 23.157 kN and 34.46 kN, the benefit of the additional tensile layer can be clearly seen. Its effect at low impact severity is less significant as the material is not catastrophically failing. The tensile layer allows the energy absorbing material to hold together for larger impacts and more than quarters the peak transmitted force from the most severe one meter drop height.

Indeed this similar foam can now pass EN1621-1 (peak force <35 kN) with the tensile layer, whereas before it would fail with only a 600 mm drop, this is a significant improvement in performance. A non textile tensile layer in the form of a plastic sheet material bonded to the energy absorbing material was also tested; this also showed a significant performance improvement. The same would be true for any foam, or any foamed dilatant combination. For example, a PU and dilatant foamed matrix would show a performance improvement with the additional tensile layer.

Another embodiment of an energy absorbing material with an additional tensile layer is now described. The energy absorbing material in this example is a thermoplastic elastomer, blended with a silicone dilatant at a ratio of 50/50. This was heat press moulded into a 3.8 mm high open waffle shape. The "waffle" can be any shape to allow air through the part. In this case it was triangular 6 mm pitch, from a 15 degree draft angle 3 mm ball end cutter. The sample was tested alone as well as moulded with a tensile layer, in this case made of textile mesh. When tested according to EN1621-1 the peak force reduced from >130 kN to 34.81 kN with the addition of the tensile layer. This is a surprising and significant improvement in impact performance. The same has also been shown to be true with different energy absorbing blends and different tensile layers were used and all have a surprising beneficial effect. Woven's textiles, non woven textiles, and unidirectional textiles all showed performance improvement when used as the tensile layer. A very thin open knitted mesh textile gave the above results showing a considerable unexpected improvement, while seemingly not affecting the overall tactile nature of the original energy absorbing blended material.

The addition of chopped fibres to the parent material would also improve the performance of the energy absorbing dilatant material, 12 mm samples of silicone dilatant were prepared with fibres as shown in the table of FIG. 1.

The fibres are working like a tensile layer, they are stopping the samples from cracking and exploding away from the impact site. Here the length of the fibre plays an important part. All the samples with added fibre show an improvement over the non filled material, as the material does not catastrophically fail. Fibres can be used at any scales along with textiles to give a tensile layer to the energy absorbing material.

One embodiment of this application, using a tensile layer and an active material for the energy absorbing system would be a single layer of a ballistic pack. In this embodiment a tensile layer of woven UHMPE and KEVLAR® were combined with active material, in this case silicone chemical dilatant. These tensile layers were integral to the energy absorbing material, in this case a silicone dilatant. For these examples the tensile layers were impregnated and coated with the energy absorbing materials, making a combined composite with the tensile layer in the centre. In tests, a high speed projectile in the dome shape of a 9 mm Full Metal Jacket was fired at multiple energy absorbing layers. Force attenuation was measure as back face signature (BFS) into non-work hardening clay. Without the tensile later (the energy absorbing material in this case) silicone dilatant was unable to stop the projectile. When the silicone dilatant was combined with the tensile layer in multiple layers the bullet was stopped. The BFS was measured for equivalent textiles without the energy absorbing material, and the BFS was 35% lower with the energy absorbing material and the tensile layer. The performance improvement was clearly shown to reduce BFS for similar thicknesses, and also to reduce BFS for similar total masses of systems.

These tests generate the following ballistics packs, of which a further embodiment is a thin layer of energy absorbing material backed onto, combined with, coated, impregnated or heat set into a tensile fibrous layer. In this case the fibre is high tenacity and either unidirectional, woven or knitted. This would be a substantially sheet material, and not a 3D network or Spacer type textile. This is different to a 3D or foamed network. Any active energy absorbing material can be used, preferably containing some dilatant material, preferably still a chemical dilatant, and preferably still silicone dilatant. It can be a thermoplastic elastomer dilatant blend as in the previous example containing a thermoplastic elastomer blended with dilatant material.

The active material, can be used as the binder for one of more layers of unidirectional material together, preferably UHMWPE, subsequently layered for the ballistic pack. In this case it may be necessary to modify the active material, preferably dilatant mass to further reduce mobility. This has been done with an additive or increased cross linking. This can also be done by combining the dilatant with another material, such as a PVC or HCR or TPE. This type of active material, can include any silicone PDMS, and some cross linker or reacted with boron, to give some chemical dilatancy and some cross links as the parent active material. Any combination of the above can be used as long as one layer contains an active material and a tensile layer.

For this embodiment, the fibers used in the single ballistic sheet can be a woven, non-woven knitted or unidirectional sheet of containment fibres for use in energy absorbing systems typically having a high tenacity and high tensile modulus. The fibers which may be preferred include aramid fibers, ultra-high molecular weight polyethylene fiber, ultra-high molecular weight polypropylene fiber, ultra-high molecular weight polyvinyl alcohol fiber and mixtures thereof.

Tests on samples of the material were performed roughly according to NIJ level 3. Following advice tests were only performed with 9 mm FMJ bullets not with the 0.357" bullets. This was done because the 9 mm test is supposedly far harder to pass than the 0.357" test, if a sample passes the 9 mm test it can be safely assumed that it would also pass the 0.357" test with respect to back face signature.

Testing for this embodiment looked at the effect of coating sheet woven ballistic Aramid material with a dilatant material on ballistic properties. The effectiveness of the coating was measured by firing 9 mm full metal jacketed bullets at the samples at 360 m/s using a helium powered gas gun and measuring the back face signature with a clay witness medium.

The energy absorbing system, using a tensile later and an active material was able to reduce the back face signature by up to 35.2% for the same number of tensile layers, with no active material or by 15.6% for the same mass. A composite panel was made out of 8 layers of uncoated KEVLAR® backed by 8 layers of coated Aramid. The composite was able to reduce the back face signature by 15.3% for the same number of layers or 10.4% for the same mass while reducing the penetration of the projectile through the pack to below that found with uncoated Aramid.

All of the test samples produced a lower back face signature at higher thicknesses. Also, the heavier the active dilatant addition the lower the back face signature. The table of FIG. 2 shows the percentage reduction in back face signature compared to an equivalent thickness textile pack for each test sample.

The results shown in the table of FIG. 2 show that the addition of active dilatant material is effective at lowering back face signature for the same number of layers, providing up to a 35.2% reduction (set I at 24 layers) compared to Aramid alone. This shows that dilatant material coated Aramid would be useful for covert jackets (where thickness is the determining factor) but does not take into account the higher mass of the coated fabric.

FIG. 2B shows a similar comparison to that of FIG. 2A showing the percentage reduction in back face signature when compared to plain KEVLAR®.

The table of FIG. 3 clearly show that the shear thickening material and tensile layer are also effective at reducing back face signature produced by a jacket of a set mass, producing up to a 15.6% reduction in back face signature and requiring fewer layers of tensile material.

A hybrid pack was made to look at the effect of different layers in a non-homogeneous pack. A composite was made of 8 layers of uncoated fabric, at the front, backed by 8 layers of heavily active (impregantated) fabric, to reduce the back face signature.

This composite of energy absorbing material and tensile layer in this structure provides approximately the same back face signature as the medium coat weight fabric at the same thickness. This shows the potential use in a hybrid pack, where different front materials can be used (possibly for improved stab protection). In this test the composite was able to reduce the back face signature by 15.3% compared to an uncoated sample of the same thickness. When mass is plotted against back face signature the benefit of the composite becomes even more obvious.

Although the pack provides approximately the same back face signature as a medium coat weight jacket for the same thickness it only weighs 587.2 g compared to 617.6 g for the medium coating weight jacket (4.9% less). If you were to make a jacket of equivalent weight from uncoated fabric (approximately 18 layers) according to this graph it would produce a back face signature of 34.5 mm compared to 30.9 mm for the composite jacket (a 10.4% reduction in back face signature for same mass). Alternatively if you were to produce a jacket out of uncoated fabric designed to provide the same back face signature as the 16 layer composite jacket it would have to be 24 layers thick and would weigh 772.8 g compared to 587.2 g for the composite jacket (a 24.0% reduction in weight for the same back face signature).

Preferably, the dilatant compound is a dimethyl-siloxane-hydro-terminated polymer. This is one that achieves chemical dilatancy. Part of this chemical dilatancy is though hydrogen bonding, this is the distinguishing piece from a mechanical shear thickening fluid 'STF' a mechanical dilatant. These hydrogen bonds by way of example only appear with a PDMS silicone polymer reacted with boron.

Another benefit of the chemical dilatant mentioned above is that it also acts as a bonding agent or adhesive. This in effect gives good adhesion in the composite. It is this good surface adhesion and rapid response to stain rate that allows for improved impact performance. The dilatant material once in the composite (by any means necessary) will adhere to the large surface area of yarns. In effect this matrix supports and retains the dilatant material. It is very difficult to remove the dilatant from the parent fibre.

Geometry

The second method of improving the performance of an energy absorbing material is to add re-entrant geometry. Different types of re-entrant geometry will be disclosed later in this application. In one case the geometry lends its self to buckling or folding inwards during impact. This type of geometry gives an unexpected benefit for energy absorption. For impact, vibration and comfort performance is improved as the geometry does not allow for the rarefaction of material at the impact site and can allow more energy absorbing material into the impact site; thus giving an improvement in performance. In a similar way that a tensile layer holds the energy absorbing material in the impact zone, the re-entrant geometry acts to locally densify material at the impact site to give a substantial performance improvement.

If we first consider, by way of example only, an extrusion of energy absorbing material as can be seen in FIG. 4. FIG. 4 is a front three quarter view showing a re-entrant section of a flexible energy absorbing material. In this example re-entrant means that if the material is cut through in vertical section (H) the material must have parts or columns or features that are non vertical. The geometry must be re-entering or pointing inwards, the geometry will thus have a re-entrant angle. This example will have a different Poisson's ratio in different directions. Across the page, when stretched the sample with gain thickness having a negative Poisson's ratio, as the columns move from their re-entrant angle to a vertical angle. When compressed the energy absorbing material will collapse inwards giving the equivalent of three thicknesses of material (t) in the impact zone. The geometry locally densifies when subjected to a normal force (F). The re-entrant geometry will not open up to give only one thickness of material, like the apexes and waves found in many conventional energy absorbing materials.

By way of example only, samples have been tested with the same geometry as above where the total height (H) is 12 mm, with a section thickness (t) of 3 mm. When compared to a the same energy absorbing material, in this case a 50/50 TPE Dilatant blend material, of similar mass, or same density but without re-entrant geometry the impact performance is improved by between 30% and 50%, with a further improvement in flexibility.

There are many other types of re-entrant geometry that can be used for the energy absorbing material. For ease of description only these are now described as a repeat unit. First let us consider a simple cylinder protruding in the direction of impact, in this case vertically. If however the cylinder were to taper outwards it would be re-entrant. It is the inclusion of a re-entrant angle that is the distinguishing feature of this geometry. A further embodiment when considering a single unit would be to consider the same cylinder, tapering out, but also shelled out from the top as shown in FIG. 5. When manufactured it would be moulded this way and not subsequently shelled out. If repeated would give us our energy absorbing material with re-entrant geometry which if sectioned at an angle crossing the mid axis would give re-entrant geometry. Thus we have a 3D repeated unit re-entrant geometry.

Similarly basic geometries can be tessellated to give a re-entrant geometry. Instead of the circle to give the tapered cylinder we can use a square, this is shown in FIG. 6. The visual representation is shown to be shelled out from below, again when sectioned vertically though the centre this gives a re-entrant geometry. A hexagon is shown as the unit in FIG. 7. These units can be repeated in any regular base pattern. Triangles, squares, hexagons or any other suitable repeat can be used. They can also vary in height and thickness for changing impact needs. They can also be flipped to give a double re-entrant geometry; this can include different materials on each side of the axis, or different geometries, to attenuate energy at different "tuned" levels.

Manufacture

The hexagon of FIG. 7 is shown without a base. It may have a base like the other two from parent energy absorbing material, or from different material. In one embodiment this can be a tensile layer. In this case a sheet material, preferably a textile based material. If repeated we can now have a re-entrant geometry, moulded onto a tensile layer. The benefits of both systems are therefore combined. Preferably, the energy absorbing material would be a injection mouldable material containing a dilatant and preferably still this would be a TPE dilatant blend. More preferably still, the tensile layer would be a textile.

Re-entrant geometries can be difficult to manufacture, especially in an open shut type tool. Geometries with a slight draft angle for better mould release or vertical geometry is possible with a two part tool. The amount of re-entrant geometry effect can be related to a re-entrant draft angle. Flexible, energy absorbing materials especially the active ones described in this application can be manufactured with re-entrant geometry as they will allow a certain amount of elastic behaviour to be removed from the tool, especially if they are removed relatively slowly One can see that the repeat units can be "peeled" from an open shut type tool.

An energy absorbing re-entrant geometry 45 degrees to the normal, can be "peeled" from a mould tool when moulded onto a tensile layer, preferably textile. Here the aforementioned benefit of the tensile layer also doubles as an aid for removing parts from tools with high re-entrant geometry. In this manner is it possible to manufacture energy absorbing materials that have re-entrant geometry, or come from a tool with negative draft angle, preferably a negative draft angle of over 15 degrees.

A more simple 2D geometry like that shown in FIG. 4 can be extruded by any means necessary, and again may be backed by a tensile layer.

A further embodiment can be manufactured by means of an open shut tool with no overlap or negative draft angle. Here the moulded geometry would be similar to that of castellations/vertical sided corrugations. Alternatively this can be extruded. This however does not have any re-entrant angle. The part can be compressed across the castellations and adhered to a textile backing. This then leaves a re-entrant geometry, similar to FIG. 4. This can be done in any way necessary but the outcome is to have re-entrant geometry with a re-entrant angle.

Alternatively a stretch textile can be used, pre-stretched then attached to the castellations, and once released this would fold the castellation inwards to give a re-entrant geometry. Two layers of castellations can be joined while compressed at different angles, to give re-entrant geometry. If any of these were to be sectioned they would show material with re-entrant geometry with its characteristic re-entrant angle.

Active Material

The energy absorbing material in the above disclosure maybe any polymer, compound, ad mixture or composite. The energy absorbing material is preferably, or at least includes, an active material. This active material is preferably a strain rate sensitive material such as a dilatant compound whose mechanical characteristics change upon impact.

The dilatant is preferably a chemical dilatant but even more preferably, a silicone dilatant. The dilatant material may include at least one of the following: silicone-based substance; or boric acid; polyvinyl alcohol, water, and borax or boric acid; starch and water; starch, water, and borax (or boric acid); silica nanoparticles in ethylene glycol (or another liquid); copolymer dispersions; and oil/water/polymer emulsions.

The energy absorbing material may be a mechanical dilatant, usually colloidal suspension in liquid. The energy absorbing material may be a chemical dilatant, active via spontaneous phase separation. The dilatant may be a mixture of chemical and mechanical dilatants.

The energy absorbing material may include a dilatant material within, or combined with a polymer material, curable material or vulcanisable material.

By way of example only a meltable material can be a silicone dilatant blend co-continuous with a thermoplastic elastomer. It can be any polymer blended with any strain rate sensitive material, preferably any dilatant.

The active material would need to contain some strain rate sensitive material. This can be achieved either chemically or mechanically. If chemically this can include, hydrogen cross links, material cross links or both. An example of a hydrogen cross link would be Polyborodimethylsiloxane. The dilatant active material would be any silicone containing borated PDMS. Other more permanent cross links are beneficial to the moulding process; indeed the active energy absorbing material can be blended or reacted with other materials to form a stable blend of cross linked material. The blending materials include, thermoplastic elastomers 'TPE', high consistency rubber, liquid silicone rubbers, PU, PE. Permanent cross links can be added to the active material by reacting with cross linking agents. Any additions of fillers, fibres, lubricants or thickeners may be used.

Test Results

Samples have been manufactured in accordance to FIGS. 8 and 9.

FIG. 8 is a drawing of a moulded re-entrant part. This has a number of re-entrant cells all with negative draft angle. The samples when compressed vertically in the normal direction have a negative Poisson's ratio. The samples geometry makes them Auxetic. They can be said to be Auxetic in the X/Y plain when compressed in the Z or 'normal' direction. For the avoidance of doubt, when locally compressed the material densifies, thus adding more material in these area. The samples are noticeably more flexible in x and y plains, negative Poisson's ratio materials are often more flexible across a saddle type structure.

The re-entrant part of the present invention as shown in FIG. 9, where 'T' is the thickness of the mould. This is scaled from up from the 10 mm, and down until T was 18, 14, 10, 8, 6 and 4 mm respectively. The size of the re-entrant cell cores was reduced slightly from parity in the 6 and 4 mm mould to aid moulding.

Within this document this geometry will now be referred to as ARMOURGEL®. ARMOURGEL®, denotes the geometry with the thickness of 18 mm. Parent material plaques were also made for solid comparison, on the same tool so as to reduce material variation. Various materials were moulded on an injection mould machine, these results are shown for a 50/50 ratio of TPE and Active material. For these results the TPE was Sibstar 130 (Kaneka) and the Active Material was equivalent to 3179 Dilatant Compound (Dow Corning). These materials were pre-processed to give a co-polymer. Textile where used was woven aramid.

The table of FIG. 10 shows results of these impact tests. These were in accordance with BSI EN1621-1: 1997 and EN1621-2: 2003, for motorcycle protective clothing. The tests were performed various samples of the current invention manufactured in accordance to FIG. 9. The ARMOURGEL® samples were all at least 65 mm square to negate any edge effects. New samples were conditioned and used for every test. The Thickness unless otherwise stated denotes the ARMOURGEL® thickness.

It can be show from the results in FIG. 3 that the geometry works well at each thickness, and that the geometry is scaleable, up and down from 10 mm samples. It gives good impact results from 18 mm down to 4 mm. Interestingly sample 4+4 denotes two layers of 4 mm thick ARMOURGEL® sample (17.3 kN) gave a similar result to one 8 mm ARMOURGEL® sample (19.6 kN). Two smaller layers work a little better, multiple layers always tend to give a performance improvement. There is also a slight increase area density with could also account for this improvement. The geometry can scale well, is still mouldable from 4 mm to 18 mm and seems to give a good compassion for like for like total thicknesses. This shows that the samples layer well, and that the geometry is scaleable.

Now if we consider 14 mm samples (12.0 kN) and a Solid 14 mm Plaque of parent material (12.1 kN) the impact attenuation is very similar. This can be explained by the re-entrant geometry, there is only actually half as much material mass when compared to the solid plaques, the 14 mm ARMOURGEL® sample is considerably more tactile, and much more flexible, especially when folded in more than one plane.

Multiple AMOURGEL® layers add benefit to EN1621-2 tests, 6+6+4+4 denotes two 6 mm layers sandwiched with two 4 mm layers (7.92 kN), is favourable over two 10 mm layers (8.44 kN) although both would pass the back protector test at level 2.

High and low temperature tests have been conducted, there seems to be little difference to the impact attenuation with temperature change, the same can be said for washing and soaking in water, and alcohols, especially for this blend of material. The 14 mm sample (11.76 kN) was laminated with an additional layer of textile, in this case woven aramid and can be seen to improve the performance to 9.35 kN.

The mass of the parts can be further reduced with fillers, fibres, or foaming. 3M micro spheres were introduced to the master batch, a further reduction in mass and also a reduction in impact performance were seen, as well as an improvement in the tactile nature of the part, they felt more tactile, and surface friction was improved Commercial Comparison Two commercially available energy absorbing materials have been included as a control. These are two existing energy absorbing systems materials on the market said to contain active materials, in both cases dilatant, both silicone based. If we compare the area density of these, we can see that for a 10 mm sample, the d30 sample weighs 5.1 kg/meter square. The 10 mm sample of the current invention the same size weighs a similar amount, equating to 5.15 kg/meter square). Thus for a given thickness the current invention is of similar area mass to a foam silicone dilatant/PU part or a foamed PU part. The current geometry although similar in mass gets a considerably lower impact result. We also compared the density with PU foam, and this was again very similar to the d30 part. Interestingly the straight PU part outperformed the orange d30 part for the same shape and density.

The object of the current invention was then compared to 2 Layers of APS S7(white), currently available from Dow Corning and trading under the name of Active Protection System, the area density is similar, although this sample is 50% thicker and again has a less favourable impact attenuation. Using open re-entrant geometry it has been shown that the current invention can make very light flexible structures with excellent energy absorbing properties. These can be lighter or thinner than current active technology, and do not have to necessarily be foamed. The density of a foamed part can be met or exceeded with re-entrant geometry. Thickness can be scaled as needed or multiple layers used.

The two commercially available samples above were both damaged during testing, repeat tests gave a significant reduction in impact performance. Repeat impacts have been conducted on all thicknesses of ArmourGel, there is very little change in impact performance with repeat impact even up to 10 repeat events.

The material according to this embodiment was tested with flat platterns/anvils on a vertical constant speed compression machine. The sample was a 10 mm thick re-entrant sample as depicted by FIG. 9. The material was a 50/50 blend of thermoplastic elastomer and silicone dilatant. FIG. 10 shows four discreet stages in compression. Stage 1 shows that at the beginning there is a little resistance to force, this would equate to a soft touch, which gives the sample a tactile feel, this is described in detail later in this application. Stage two shows a constant increase in force with compression, gentle uptake of load, or comfort loading, again described later in this application. Stage three shows and increase in load at an accelerating rate, this gives good performance to shock absorption. The sample was photographed with a high speed camera; the central cells are collapsing in on themselves from 3.5 mm to 6.5 mm compression and the sample densifies. This is the important area for the re-entrant effect. Material gets drawn into the centre of the sample from 3.5 mm compression onwards, local density if material would increase, in the zone the material can be said to have a negative Poisson's ratio. The material is locally auxetic because of the geometry. Stage 4; Shows the extreme protective stage, the material has been compressed and shows continued negative Poisson's ratio. Material densifies and in the central region, giving an improved protective stage. The second plot line shows a typical output for a PU foam showing the plateau region.

A material according to the embodiments of the invention has also been shown to be a good vibration damper. 10 mm thick textile backed ArmourGel pads, 65 mm Square were tested as a vibration damper in a HiFi setup as described below.

They were tested against a leading HiFi separates mount. This main isolation platform was a 4 layer corian construction, with 5 isolation pads, and multiple damping pads. There was a secondary suspended platform Dampers were estimated to be spectra type material. This is a very advanced and expensive HiFi vibration isolation platform the layout of which is shown in FIG. 11.

The graphs in FIGS. 12A and 12B show the damping isolation platforms with a load of 10 KG placed on top. The traces are taken from two accelerometers, one placed on the 10 kg mass and the other on the table. The table was excited with a soft mallet. Peak table acceleration was 5.97 for the table accelerometer and reduced to 0.806 for the damped platform, a reduction of 7.5 times.

The graph of FIG. 12B shows the same 10 KG mass placed upon two 10 mm textile backed ArmourGel pads. The peak excitation acceleration signal was 7.6 (table) and the damped gave a signal of 0.517, a reduction of over a magnitude.

These two systems were tested against back ground noise, and the transfer function response was measured. The HiFi platform gave a reduction of about −18 db, the typical transfer function is shown in FIG. 13.

A similar test was conducted for the two 10 mm ArmourGel pads, the typical damping was −25 db.

The sample pads of the current invention make excellent vibration dampers and anti vibration pads, for a vanity of different loads, even impact loads, and for a large range of frequencies. The material can be over moulded on a variety offhand operated or motor driven equipment to reduce vibration.

For reducing impacts and abrasions on the human body it is beneficial that the system has good pressure and load spreading properties. The features of the present invention allow for a very good pressure distribution when used on or near the human body. The active material can often be very conforming and give good tactile properties. The geometry can often bend and follow complex curves to give good even distribution, and the benefit of a textile surface can further improve pressure and tactile qualities. The better fitting a system, the better the pressure distribution, the more comfortable a system will be to the end user.

The materials of the present invention will give a beneficial tactile or comfort benefit, in addition to a vibration and impact performance, as previously discussed. Reference will now be made to the use of the material as an active tactile material, or surface.

There are many applications in which an operator uses a specific handle, grip or control surface, for a variety of functions and reference will now be made to the handle of a tool, by way of example.

Tool Handle

A screwdriver, for example, essentially comprises of a tool end or bit connected to a shaft, through to a grip or handle. We are not concerned with the driving bit end or the ergonomics of the handle in this case, although these do play a part in the use of the tool. Let us consider that we have either a weak grip, or that we are using the tool in a confined or difficult to reach space. In order to tighten a fixing, we need to exert a rotational and longitudinal force on the driver. If the rotational force is too much and the longitudinal force too little the driver will "slip" or eventually "cam" out, or there is not sufficient driving force exerted to continue tightening the fixing. The user is ultimately limited in the amount of force that can be applied to the driven end. If we have an active material in the handle that can slowly conform to our grip, but then remains in that shape momentarily while we "drive" or turn the handle, an improvement can be envisaged.

Potentially the limit of grip is either the force of the grip, or the fact that the handle slips, or that the skin on the inner surface of the hand starts to hurt. The materials of this invention seek to improve the amount of torque and loading on the tool, by way of forming an active handle.

Adding an active material, according to an embodiment of the current invention, to some or all of the handle, the driving grip is considerably improved, giving greater driving force. Comfort is improved and there is also an improvement in control irrespective of the skill or strength of the operator. The handle will allow a more even distribution of pressure from the device to the user as well as offering more support for moments of higher load. Once the screw driver is released and re-gripped the active tactile surface will slowly return to its normal shape allowing for reuse, or re-gripping for the next indexing of the tool. It will again form to the shape of the user and improve drive. This process can be repeated as often as needed and for many different times and ways of holding the tool handle. Some or all of the handle will contain the active material. If we add the re-entrant geometry then the grip with is further improved.

Sports Equipment

The materials of this invention can also be used in the handle of a piece of sporting equipment so as to improve vibration and shock absorption as well as add to the tactile properties of the handle.

Considering a golf club handle, for example, the handle is the only interface between the player and the shaft leading to the head of the club. An improved handle in this area has its clear advantages for improved control of the club head. Some or all the handle or grip will contain an active material improving the tactile qualities of the product. We can consider an over moulding with re-entrant ribs, linearly alighted with the shaft they would further help to dampen the shocks and vibrations, if these were in radial plane they would help to control the torque applied to the club.

If we consider a tennis handle, there can be an outer textile layer, that further improves the tactile surface, and behaves as the tensile layer of the current invention.

While gripping the handle the active material or the present invention is able to conform and "flow" within the players grip, giving improved comfort and more even pressure distribution. This would happen over time as the player approaches and addresses the ball. During the swing the loading on the handle would increase and consequently the active material would change properties becoming more rigid and provide better control. Once the swing has occurred the active tactile material would return to its soft malleable and flexible state. An added benefit in a golf handle would be the improved ability to absorb vibration and spread this over a large area within the handle and consequently hands of the player.

The materials of the present invention would also help to improve fatigue if used in spotting equipment handles; racket handles are equally applicable where controlled comfort and fatigue may be an issue. Use of the material according to the invention may lead to a reduction in problems such as "tennis elbow", and other repetitive strain injuries. The material could be used in conjunction with the over grip or wrap. The wrap itself can contain the active material, a further embodiment the inner handle or core can contain the active material, still allowing for a removable and changeable outer grip or over grip. There would need to be some active material between the shaft of the club or main body of the racket and the sports person's hands. There can be an over tensile layer that forms part of the textile of the grip.

Motorcycle/Bike Grip

The motorcycle grip can be described as the part the control surface that fits between the hand of the rider and the handle bar. In the case of motorcycles these are called "grips", but can also be called a handle.

This can be the handle of a sports motorbike, scooter or bicycle. Let us consider by way of example only, the throttle handle of an off road motorcycle racer. Many riders get tried while racing, this is often called "arm pump" and means that the racer may need to slowdown while his muscles recover.

The throttle handle has been chosen on an off road bike as it is one of the most demanding applications. The rider must control the steering of the bike through the handle. He must also control the twist of the handle for throttle position, and will typically use one or more index fingers released from the grip for operation of the front brake lever. This means that there is often a reduced grip as one or more fingers are no longer contributing to the gripping force. Typically the grip maybe rotated through as much as half a turn while operating the throttle. A racer must also deal with large undulations and bumps on track as well as a variety of body positions.

Consequently the handle is griped in many different ways, at different angles as the throttle is twisted and sometimes with a reduced grip when the brake maybe operated.

It is the intention of the present invention to improve the ability of the rider to hold on to this handle, with reduced fatigue and also improved dexterity and control. The material will improve contact area on the riders hand. It is the object of the present inventions to provide improved pressure distribution by conforming to the hand, and help to reduce fatigue of the rider. The active material in the handle will constantly slowly conform to the riders hand and give better and more even pressure distribution. If the machine were to hit a hard edge or whoop the active handle of the present invention will stiffen up and provide better support. Once the hard edge has been passed over the grip will continue to conform to the rider softening back up, constantly conforming to the changing conditions and hand positions.

The energy absorbing system in a handle will give reduced fatigue, better performance, and improved control.

There is a further improvement on motor machinery handles, mainly experienced in two stoke machinery and large single cylinder bikes that the current invention will also help to dampen the vibrations apparent with reciprocating machinery. The active grip will also help reduce the loss of feeling in the fingers due to vibrations transmitted through the machine. The active material will conform better to the hand of the rider and also help to dampen out mechanical vibrations.

The material can also be used on any control surface and is not limited to those described above, grips, bar ends, gear sticks, flight sticks, steering wheels, chain saws, pneumatic drills, vibration rollers etc. The handle is described as the material that fits between the users hand often called a "grip" and the main body of the device.

There would also be a comfort and control benefit it the equipment was to be used for long periods of time, especially for repetitive events, Jack hammers and chainsaws would be obvious examples.

Disabilities or Weak Grips

If the user has a reduced gripping force due to a disability or injury the present invention would help with control, grip and fatigue. Someone with a weak grip may use the material of the present invention to gain better dexterity of any object held in the hand. The tactile material would conform easily to the hand over time. Moulding to the grip of the user and giving good pressure distribution. The material would continue to stay in this shape for short periods of time with increased loading, e.g. forcing a fork into a potato. By way of careful deign, the handle of this type can be moved from one device to another. Such a universal handle can be transferred from say a spoon to a fork, or knife.

In embodiments of the present invention, the active tactile material can be an over grip which can be transferred from one device to another, such as from a screw driver handle to a ratchet handle. Even if the handles were slightly different sizes the handle would conform equally well to both devices as well as to left or right hand or different sized hand of different users.

Other Tactile Surfaces

The benefits of the current invention may also be applied to other areas of the body, we have mainly concerned ourselves with hands, grips and handles, although other areas that over improved comfort and reduced fatigue would also benefit from active tactile material. Used in Innersoles or parts of shoes giving improved comfort, better fit and improved pressure distribution, while giving support for jumping or running would be beneficial and would reduce fatigue in operators when standing all day. It can also add improved control if placed in sports shoes or trainers. The material of the invention would give better pressure distribution for light loads, conforming to the sole of the user. For a sudden movement, such as a "heal strike" when running or a sudden change of direction, the energy absorbing tactile system would change properties, stiffening up momentarily to provide improved support. The material would then return to its original conforming comfortable state. Samples of active re-entrant textile backed energy absorbing systems have been tested as insoles with good feedback both on comfort, tactile properties and energy absorption.

Anti-fatigue mats for machinists would also be a possible embodiment, where the object of the current invention is now placed in a "mat" or pad below an operator to reduce fatigue while standing for long periods of time, Gloves An alternative use of the material of the current invention is to place the active tactile material on a glove. It is still offering the benefit of use between the operators hand and the device, but this time is held in the glove. The glove can behave like the tensile layer. This would allow for a similar improvement while allowing the active tactile material to be worn for any device, providing good pressure distributions, vibration damping and energy absorption.

This application is a different slower loading regime to that of high energy absorbing material. At high speeds and movements the energy absorbing system is used to absorb impact energy, in its high strain rate state, at low speeds, and for the sake of clarity the current invention uses the energy absorbing system, at slow rates, as a highly tactile material that behaves a like a fluid under small longer loads. This gives good comfort as it moulds into shape, and excellent pressure distribution. To some extent it has memory and will take on the shape of the driving surfaces. For short periods of time the active tactile materials surface can take higher changing loads without deforming and as the active material stiffens up (with strain rate) the active (dilatant) effect as has been shown to be the case for a screw driver handle. The material then returns back to its soft compliant shape again giving good pressure distribution.

In the example of a screw driver handle, there will be improved surface area contacted on the users hand as the tactile material moves and moulds slowly to the users grip. This intern gives good pressure distribution between the hand and the screwdriver shaft. This behaves in a similar way to a very soft grip, giving good compliance and comfort. The problem with an overly soft grip is that for large loads they will simply move out of the way, continuing to deform too much. In the case of the current invention the properties of the grip at this point will stiffen giving better contact and support, not being pushed out of the way. Once the load is removed the material is again free to flow to the contour of the user.

The active tactile material of the invention can be combinations of other materials, but preferably contains some material with dilatant properties, to give the active tactile feel. This may be manufactured by any suitable method, and maybe over moulded.

The active tactile material of this invention may contain chemical or mechanical dilatants. Mechanical dilatants are often referred to as Shear thickening fluids STF's. These materials can be contained in a screw driver handle as a fluid, between a core material and an outer material or cover. A handle of this nature would exhibit dilatant properties.

The dilatant may be mixed or combined with an elastic compound, to give the active tactile surface.

The dilatant and can be obtained, for example, by the method of production described in Japanese Published (Kokoku) Patent Application No. Sho 26-006944 [6,944/1951]. In specific terms, a silicone bouncing putty can be obtained by polymerizing 10 to 90 parts (=weight parts here and below) dimethylsiloxane having alkoxy at both terminals and a viscosity at 25° C. of 1 to 1,000 centistokes (cSt) with 90 to 10 parts dimethylsiloxane having hydroxyl at both terminals and a viscosity at 25° C. of 1 to 10,000 cSt, 0.1 to 15 parts boric acid, and 0 to 20 parts colloidal silica, for example, for 2 to 10 hours at 140-150° C. in a kneader, during this process the material may be blended with other fillers and materials.

The dilatant tactile material can be contained in an envelope.

The active tactile material can be tuned to the application, by varying the ratio of dilatant used.

The active tactile material can be tuned to the application, by varying amount of lubricant, fibres or fillers used.

The dilatant tactile material may contain a blend of other the materials. Suitable blending materials, can be elastic, including thermo plastic elasomers. Compositions of silicones dilatant and high consistency rubbers would be suitable. Composites of Liquid silicone rubbers would also be suitable. Dilatants blended into TPE would also be suitable.

The dilatant material can also be modified with fillers or fibres.

The dilatant material can be cross linked to further reduce mobility and tune the tactile material, by any known method.

The dilatant can also be held in a woven, non woven, grip tape to be added to handle core of a racket.

The dilatant tactile surface can be used with any other soft grip or moulding, but exhibits active properties, allowing the material to conform to the user giving a comfortable handle, which gives a even pressure distribution, between the main body of the handle and the users hand. This can take much larger loads without deforming for short periods of time. The grip will continuously conform to the users changing grip. Reducing fatigue and improving control and performance. Many modifications and variations of the invention falling within the terms of the following claims will be apparent to those skilled in the art and the foregoing description should be regarded as a description of the preferred embodiments of the invention only.

The invention claimed is:

1. A flexible energy absorbing system, comprising:
   an active layer, comprising:
      a plurality of adjacent cells,
         wherein each respective cell in the plurality of adjacent cells comprises a vertical cross-section, parallel to the longitundinal direction of the respective cell, with a re-entrant geometry,
         wherein each respective cell in the plurality of adjacent cells comprises a strain rate sensitive material, and
         wherein each respective cell in the plurality of adjacent cells comprises a first opening to a re-entrant recess at a first end of the vertical cross-section of the respective cell.

2. The flexible energy absorbing system according to claim 1, wherein each respective cell of the plurality of adjacent cells is in the form of a tapering cylinder extending in a direction of the vertical cross-section of the respective cell.

3. The flexible energy absorbing system according to claim 1, wherein each respective cell of the plurality of adjacent cells is in the form of a tapering rectangular prism extending in a direction of the vertical cross-section of the respective cell.

4. The flexible energy absorbing system according to claim 1, wherein each respective cell of the plurality of adjacent cells is in the form of a tapering polygonal prism extending in a direction of the vertical cross-section of the respective cell.

5. The flexible energy absorbing system according to claim 4, wherein each respective cell of the plurality of adjacent cells tessellates or overlaps with at least one cell adjacent to the respective cell.

6. The flexible energy absorbing system according to claim 1, wherein each respective cell of the plurality of adjacent cells is formed from one of corrugations and folds in the active layer, and wherein a wall of each corrugation or fold forms a re-entrant angle with respect to the vertical cross-section of the respective cell.

7. The flexible energy absorbing system according to claim 1, wherein each respective cell of the plurality of adjacent cells extends at least partially through the thickness of the active layer.

8. The flexible energy absorbing system according to claim 1,
   wherein each respective cell in the plurality of adjacent cells comprises a second opening to the re-entrant recess at a second end of the vertical cross-section of the respective cell, opposite the first end, and
   wherein the first and second openings are arranged along the length of the vertical cross-section.

9. The flexible energy absorbing system according to claim 8, wherein the second opening comprises a circular aperture.

10. The flexible energy absorbing system according to claim 8, further comprising: a tensile layer.

11. The flexible energy absorbing system according to claim 10, wherein the tensile layer comprises a textile material.

12. The flexible energy absorbing system according to claim 10, wherein the tensile layer is integral with the active layer.

13. The flexible energy absorbing system according to claim 10, wherein the tensile layer is attached to the active layer.

14. The flexible energy absorbing system according to claim 1, wherein the strain rate sensitive material exhibits a negative Poisson's ratio.

15. The flexible energy absorbing system according to claim 1, wherein the strain rate sensitive material is a dilatant.

16. The flexible energy absorbing system according to claim 1, further comprising: a tensile layer.

17. The flexible energy absorbing system according to claim 16, wherein the tensile layer is integral with the active layer.

18. The flexible energy absorbing system according to claim 16, wherein the tensile layer comprises a textile material.

19. The flexible energy absorbing system according to claim 16, wherein the tensile layer is attached to the active layer.

20. The flexible energy absorbing system according to claim 16, wherein the tensile layer comprises a fibrous material.

21. The flexible energy absorbing system according to claim 1, further comprising: chopped fibers.

* * * * *